US012590866B2

(12) United States Patent
Yamada et al.

(10) Patent No.: US 12,590,866 B2
(45) Date of Patent: Mar. 31, 2026

(54) OPTICAL FIBER TEST METHOD AND WRAPPING OPTICAL FIBER DEVICE

(71) Applicant: NTT, Inc., Tokyo (JP)

(72) Inventors: Yusuke Yamada, Musashino (JP); Masashi Kikuchi, Musashino (JP); Akira Sakurai, Musashino (JP); Shigekatsu Tetsutani, Musashino (JP); Hiroaki Tanioka, Musashino (JP)

(73) Assignee: NTT, Inc., Tokyo (JP)

( * ) Notice: Subject to any disclaimer, the term of this patent is extended or adjusted under 35 U.S.C. 154(b) by 105 days.

(21) Appl. No.: 18/289,233

(22) PCT Filed: May 31, 2021

(86) PCT No.: PCT/JP2021/020754
§ 371 (c)(1),
(2) Date: Nov. 2, 2023

(87) PCT Pub. No.: WO2022/254557
PCT Pub. Date: Dec. 8, 2022

(65) Prior Publication Data
US 2024/0248001 A1 Jul. 25, 2024

(51) Int. Cl.
*G01M 11/00* (2006.01)

(52) U.S. Cl.
CPC .............................. *G01M 11/3109* (2013.01)

(58) Field of Classification Search
CPC .. B65H 2701/32; B65H 63/00; B65H 63/024; C03B 37/12; G01M 11/00; G01M 11/088; G01N 3/00; G02B 6/02; G02B 6/4458
(Continued)

(56) References Cited

U.S. PATENT DOCUMENTS

| | | | |
|---|---|---|---|
| 2011/0110635 A1 | 5/2011 | Toge et al. | |
| 2019/0010013 A1 | 1/2019 | Suzuki | |

(Continued)

FOREIGN PATENT DOCUMENTS

| | | |
|---|---|---|
| CN | 111829754 A | 10/2020 |
| JP | H8-210948 A | 8/1996 |

(Continued)

OTHER PUBLICATIONS

John A. Jay, "An Overview of Macrobending and Microbending of Optical Fibers", https://www.corning.com/media/worldwide/coc/documents/Fiber/white-paper/WP1212.pdf, retrieved on May 14, 2021.

*Primary Examiner* — Sunghee Y Gray

(57) ABSTRACT

An object of the present invention is to provide an optical fiber testing method and an optical fiber winding device capable of appropriately reproducing the same lateral pressure and minute bending state in a test of an optical fiber as those in an optical cable.
In the optical fiber testing method according to the present invention, an optical fiber 51-2 of the second layer wound around a bobbin 12 is used as an object to be tested. Lateral pressure to the optical fiber 51-2 of the second layer is applied by an optical fiber 51-3 of the third layer. The lateral pressure is adjusted by a tension when the optical fiber 51-3 of the third layer is wound around the bobbin. In other words, since the lateral pressure is applied to the optical fiber to be tested from another optical fiber, the same lateral pressure and minute bending state as those in the optical cable can be reproduced.

3 Claims, 6 Drawing Sheets

(58) Field of Classification Search
USPC ........................................................ 356/73.1
See application file for complete search history.

(56)                    References Cited

U.S. PATENT DOCUMENTS

2022/0190660  A1 *   6/2022   Flower ..................... H02K 1/28
2022/0341814  A1 *   10/2022   Luo ................... G01M 11/0207

FOREIGN PATENT DOCUMENTS

KR       10-2005-0007040  A       1/2005
KR                100549348  B1 *   2/2006   ............. C03B 37/07
WO       WO-2010/001663  A1      1/2010
WO       WO-2017/159848  A1      9/2017

* cited by examiner

MOVEMENT IN AXIAL DIRECTION OF BOBBIN ACCORDING TO ROTATION OF BOBBIN

OPTICAL FIBER TEST METHOD AND WRAPPING OPTICAL FIBER DEVICE

CROSS-REFERENCE TO RELATED APPLICATIONS

This application is a 371 U.S. National Phase of International Application No. PCT/JP2021/020754, filed on May 31, 2021. The entire disclosure of the above application is incorporated herein by reference.

TECHNICAL FIELD

The present disclosure relates to an optical fiber testing method for testing optical characteristics of an optical fiber, and an optical fiber winding device used in the testing.

BACKGROUND ART

An optical fiber cable with a small diameter and high density by bundling optical fiber core wires has been proposed (see, for example, PTL 1). This optical fiber cable is formed by bundling optical fiber core wires at high density. Such a structure makes the fiber thinner and lighter, thereby improving handling properties and contributing to the construction of an economical optical fiber network. In realizing such an optical cable, it is necessary to design an optical fiber so as not to cause an increase in optical loss due to cabling.

Generally, it is known that an optical fiber has an increased optical loss, which is caused by minute bending of the optical fiber, that is, microbend loss, when lateral pressure above a certain level is applied. Several methods of testing such microbend loss characteristics due to lateral pressure have been proposed. Of the testing methods, FIG. 1(a) is a view illustrating a wire mesh method and FIG. 1(b) is a view illustrating a sandpaper method.

The wire mesh method illustrated in FIG. 1(a) is a method in which an optical fiber 50 to be measured is wound on a wire mesh 20 previously wound around a cylindrical bobbin 10 to perform optical loss measurement. In FIG. 1, (X) is a view illustrating a cross section (a part of the surface of the bobbin in the cross section) intersected by a plane perpendicular to the axial direction of the bobbin, and (Y) is a view illustrating a cross section (a part of the surface of the bobbin in the cross section) intersected by a plane including the axis of the bobbin.

The sandpaper method illustrated in FIG. 1(b) is a method in which the optical fiber 50 to be measured is wound on a sandpaper 30 previously wound around the cylindrical bobbin 10 to perform optical loss measurement.

Both of them are methods of pressing the optical fiber 50 against the wire mesh 20 and the sandpaper 30 to give lateral pressure and minute bending, and testing the microbend loss characteristics (see, for example, NPL 1).

CITATION LIST

Patent Literature

[PTL 1] WO 2010/001663

Non Patent Literature

[NPL 1] "An Overview of Macrobending and Microbending of Optical Fibers," Internet URL https://www.corning.com/media/worldwide/coc/documents/Fiber/white-paper/WP1212.pdf, retrieved on May 14, 2021

SUMMARY OF INVENTION

Technical Problem

However, in the technique of NPL 1, the loss characteristics greatly differ depending on the wire diameter and mesh roughness of the wire mesh or the particle roughness and shape of the sandpaper. In the case of the wire mesh, the lateral pressure applied to the optical fiber acts only on the surface where the wire mesh and the optical fiber are in contact with each other so as to cross each other as illustrated in FIG. 1(a), and the condition is greatly different from the condition of the optical fiber in the optical cable.

Similarly, also in the case of the sandpaper, the lateral pressure acts on the optical fiber only on the surface where the unevenness of the sandpaper is irregularly in contact with the optical fiber as illustrated in FIG. 1(b), and the condition is greatly different from the condition of the optical fiber in the optical cable.

In other words, in the technique of NPL 1, it is difficult to appropriately reproduce the same lateral pressure and minute bending state as those in the optical cable in the test of an optical fiber, and it is only possible to compare the relative characteristics of the optical fiber under the same test conditions. Therefore, the technique of NPL 1 has a problem that it is difficult to design an optical fiber so as to suppress the loss of a high-density optical cable.

Therefore, in order to solve the above problem, an object of the present invention is to provide an optical fiber testing method and an optical fiber winding device capable of appropriately reproducing the same lateral pressure and minute bending state in a test of an optical fiber as those in an optical cable.

Solution to Problem

In order to achieve the above-mentioned object, an optical fiber testing method and an optical fiber winding device according to the present invention have a function of bringing optical fibers into contact with each other and applying minute bending due to lateral pressure as in the case of a high-density optical cable.

Specifically, an optical fiber testing method according to the present invention includes:

winding three layers of optical fibers around a bobbin;

applying a desired tension to the optical fiber when the optical fiber of the third layer is wound around the bobbin, which is stronger than a tension when the optical fibers of the first and second layers are wound around the bobbin; and performing optical measurement on the optical fiber of the second layer.

Further, an optical fiber winding device according to the present invention includes: a bobbin for winding an optical fiber that is supplied; a positioning portion for winding the optical fiber at a desired position in an axial direction of the bobbin; and a tension controller that applies a desired tension to the optical fiber when the optical fiber is wound around the bobbin.

The optical fiber winding device according to the present invention further includes a tension measuring portion that measures a tension applied to the optical fiber and feeds back the measured tension to the tension controller so that the measured tension becomes the desired tension.

In the optical fiber winding device according to the present invention, the positioning portion sets a movement amount $\Delta$ in an axial direction of the bobbin to be $D \leq \Delta < 2D$ each time the bobbin rotates once, where D is an outer diameter of the optical fiber.

In the optical fiber winding device according to the present invention, the tension controller applies a desired tension to the optical fiber when the optical fiber of the third layer is wound around the bobbin, which is stronger than a tension when the optical fibers of the first and second layers are wound around the bobbin.

The optical fiber winding device according to the present invention further includes an optical measuring instrument for performing optical measurement on the optical fiber of the second layer.

In this optical fiber testing method, as illustrated in FIG. 1(c), an optical fiber 51-2 of the second layer wound around a bobbin 12 is used as an object to be tested. Lateral pressure to the optical fiber 51-2 of the second layer is applied by an optical fiber 51-3 of the third layer. The lateral pressure is adjusted by a tension when the optical fiber 51-3 of the third layer is wound around the bobbin. In other words, since the lateral pressure is applied to the optical fiber to be tested from another optical fiber, the same lateral pressure and minute bending state as those in the optical cable can be reproduced.

Accordingly, the present invention can provide an optical fiber testing method and an optical fiber winding device capable of appropriately reproducing the same lateral pressure and minute bending state as those in the optical cable in the test of an optical fiber.

In this optical fiber testing method, the number of the optical fibers may be one, and in the optical measurement, a section corresponding to the second layer of the optical fibers may be measured, or the number of the optical fibers may be three, and each of the three optical fibers may be wound on each layer.

The above inventions can be combined whenever possible.

Advantageous Effects of Invention

The present invention can provide an optical fiber testing method and an optical fiber winding device capable of appropriately reproducing the same lateral pressure and minute bending state in the test of an optical fiber as those in the optical cable.

DESCRIPTION OF EMBODIMENTS

Figure 1:
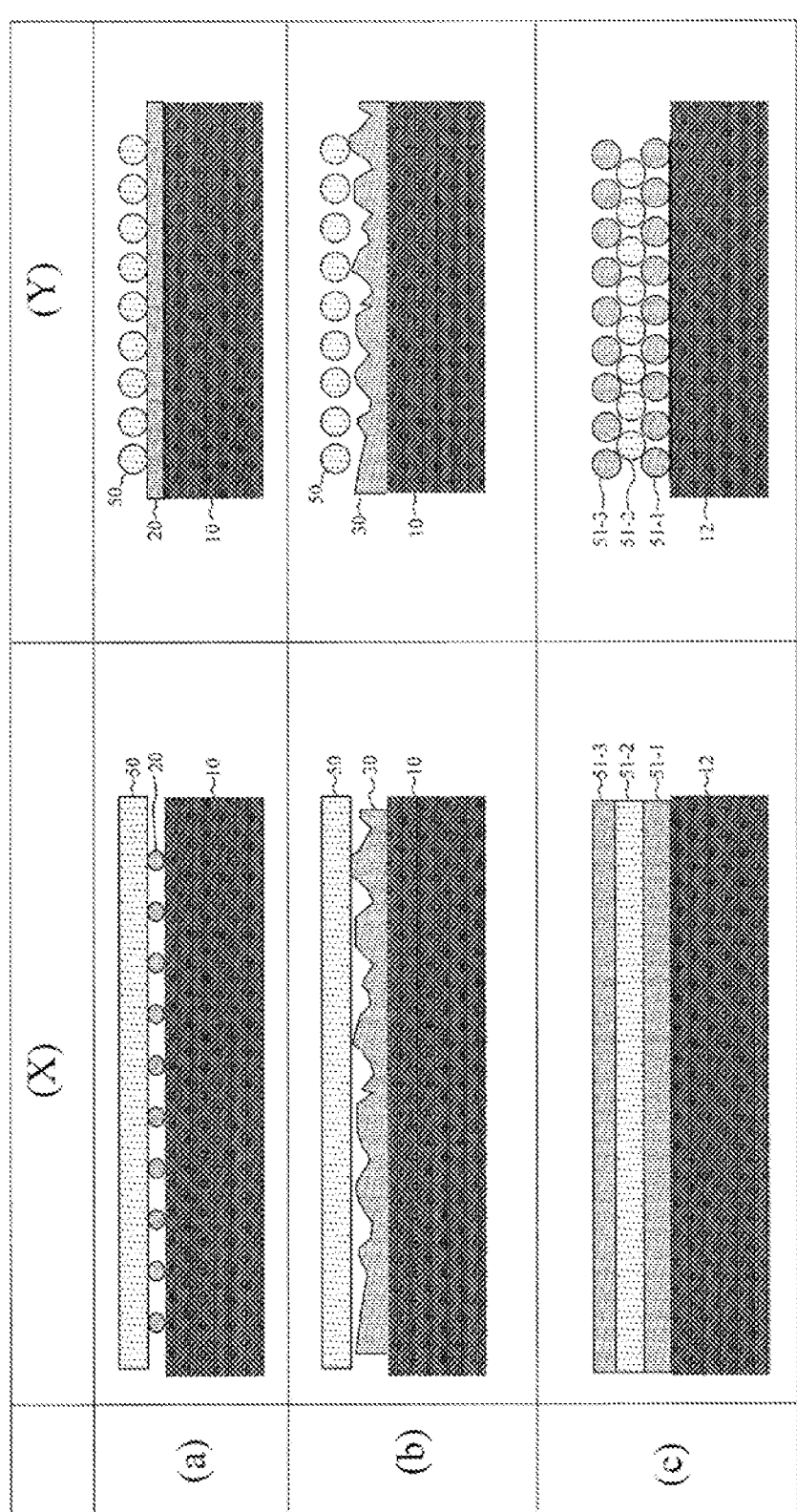
FIG. 1 is a view illustrating a method of applying lateral pressure and minute bending to an optical fiber.

Embodiments of the present invention will be described with reference to the accompanying drawings. The embodiments described below are examples of the present invention, and the present invention is not limited to the following embodiments.

Note that, in the present specification and the drawings, components having the same reference numerals indicate the same components.

Figure 2:
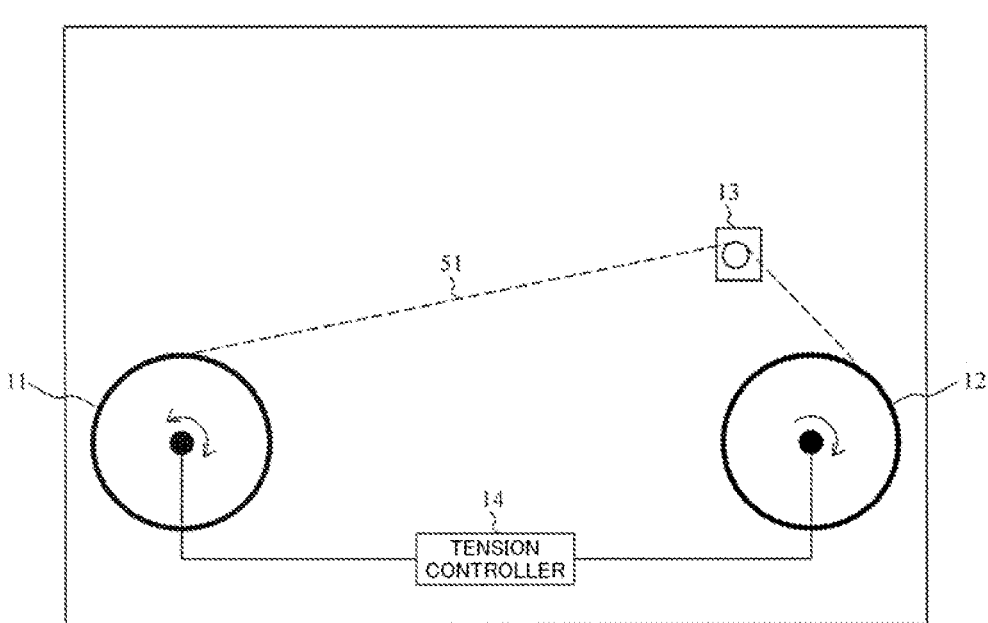
FIG. 2 is a view illustrating the structure of an optical fiber winding device according to the present invention.

FIG. 2 is a view illustrating the configuration of an optical fiber winding device according to the present embodiment. The optical fiber winding device includes:

a winding-side bobbin 12 for winding an optical fiber 51 supplied from a feeding-out-side bobbin 11;

a positioning portion 13 for winding the optical fiber 51 at a desired position in the axial direction of the bobbin 12; and a tension controller 14 that applies a desired tension to the optical fiber 51 when the optical fiber 51 is wound around the bobbin 12.

The optical fiber 51 is wound in advance around the feeding-out-side bobbin 11. Here, the optical fiber 50 is an optical fiber to be tested, and the optical fiber 51 is an optical fiber for creating the same environment as in the optical cable. The optical fiber 51 is fed out from the feeding-out-side bobbin 11 and wound around the winding-side bobbin 12. Power for winding is applied to the shaft portion of the winding-side bobbin 12, and for example, an electric motor may be used.

A function capable of applying tension to the optical fiber is imparted to the shaft of the feeding-out-side bobbin 11. This function is a brake or an electric motor. The tension can be applied to the optical fiber 51 by applying a brake to the rotation of the bobbin 11 or by making the number of rotations of the bobbin 11 slightly lower than the number of rotations of the bobbin 12 with an electric motor. The tension controller 14 can control the strength of the brake or the number of rotations of the electric motor to control the tension applied to the optical fiber 51.

Figure 3:
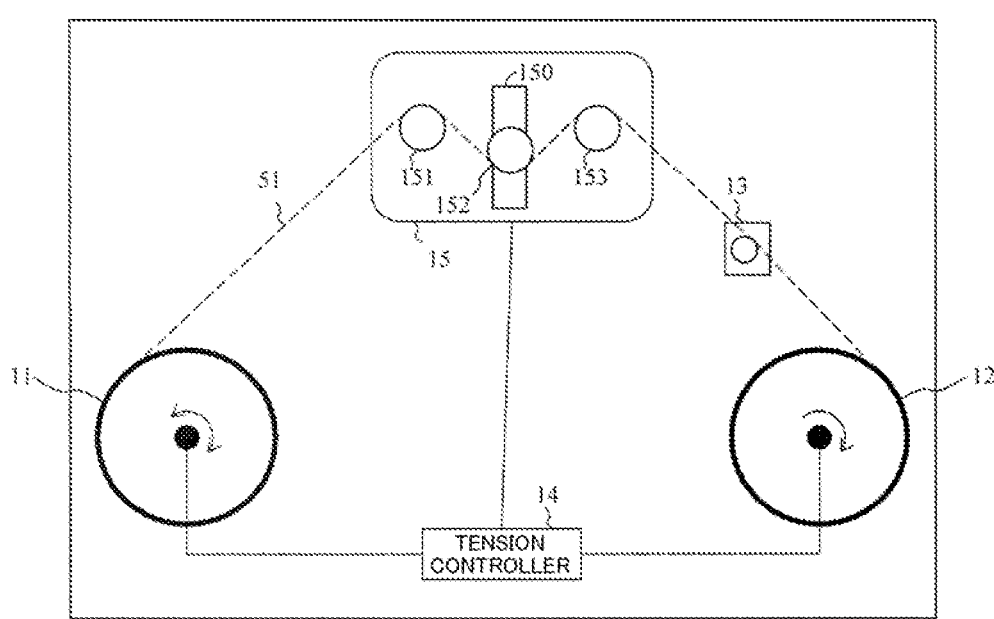
FIG. 3 is a view illustrating the structure of the optical fiber winding device according to the present invention.

As illustrated in FIG. 3, the optical fiber winding device of the present invention may further include a tension measuring portion 15 that measures a tension applied to the optical fiber 51 and feeds back the measured tension to the tension controller 14 so that the measured tension becomes the desired tension.

As illustrated in FIG. 3, for example, the tension measuring portion 15 includes three pulleys (151, 152, and 153) and a measuring instrument 150, and the optical fiber 51 is disposed so as to meander on the three pulleys. When a tension is applied to the optical fiber 51, a force to push up the optical fiber 51 to the central pulley 152 is applied by a force to make the optical fiber 51 straight. The tension can be measured by measuring this force with the measuring instrument 150. Further, the tension measuring portion 15 feeds back this tension to the tension controller 14, so that the desired tension can be kept constant.

Figure 4:
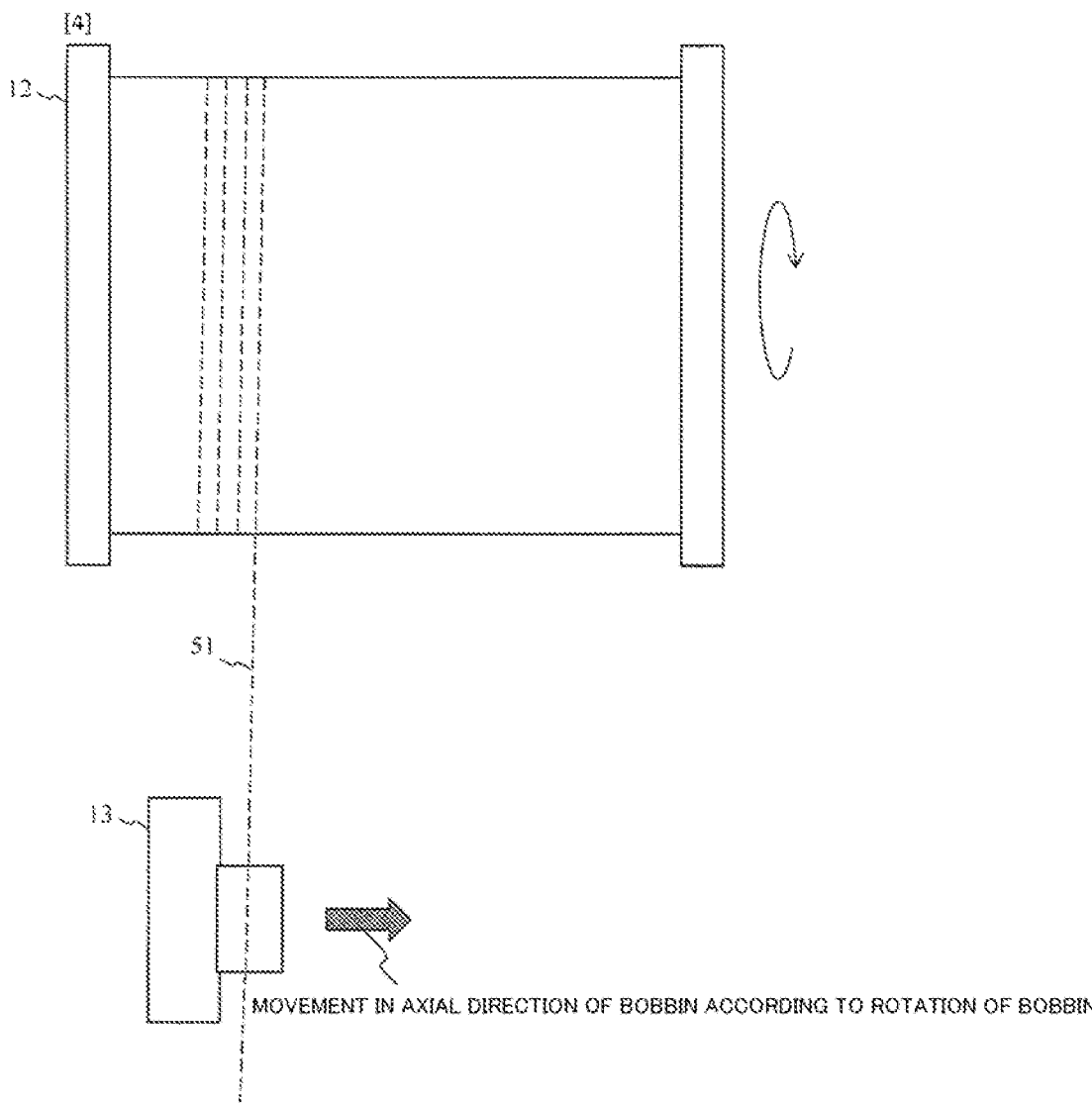
FIG. 4 is a view illustrating a positioning portion of the optical fiber winding device according to the present invention.

FIG. 4 is a view illustrating the structure of the positioning portion 13. The positioning portion 13 moves the optical fiber 51 in the axial direction of the bobbin 12 while the winding-side bobbin 12 rotates once, so that the optical fiber 51 can be wound around so as not to be lopsidedly inclined toward one place of the bobbin 12. For example, when the outer diameter of the optical fiber 51 is referred to as D, the positioning portion 13 preferably sets a movement amount $\Delta$ in the axial direction of the bobbin 12 to be $D \leq \Delta < 2D$ each time the bobbin 12 rotates once.

The outer diameter of the optical fiber 51 is referred to as D. The movement amount of the positioning portion 13 with respect to the axial direction of the bobbin 12 each time the bobbin 12 rotates once is referred to as $\Delta$. By setting the movement amount Δ to D≤Δ, the adjacent optical fibers of each layer can be prevented from coming into contact with each other. Further, by setting the movement amount Δ to Δ<2D, the optical fibers in the upper layer can be prevented from entering between the optical fibers in the lower layer.

Figure 5:
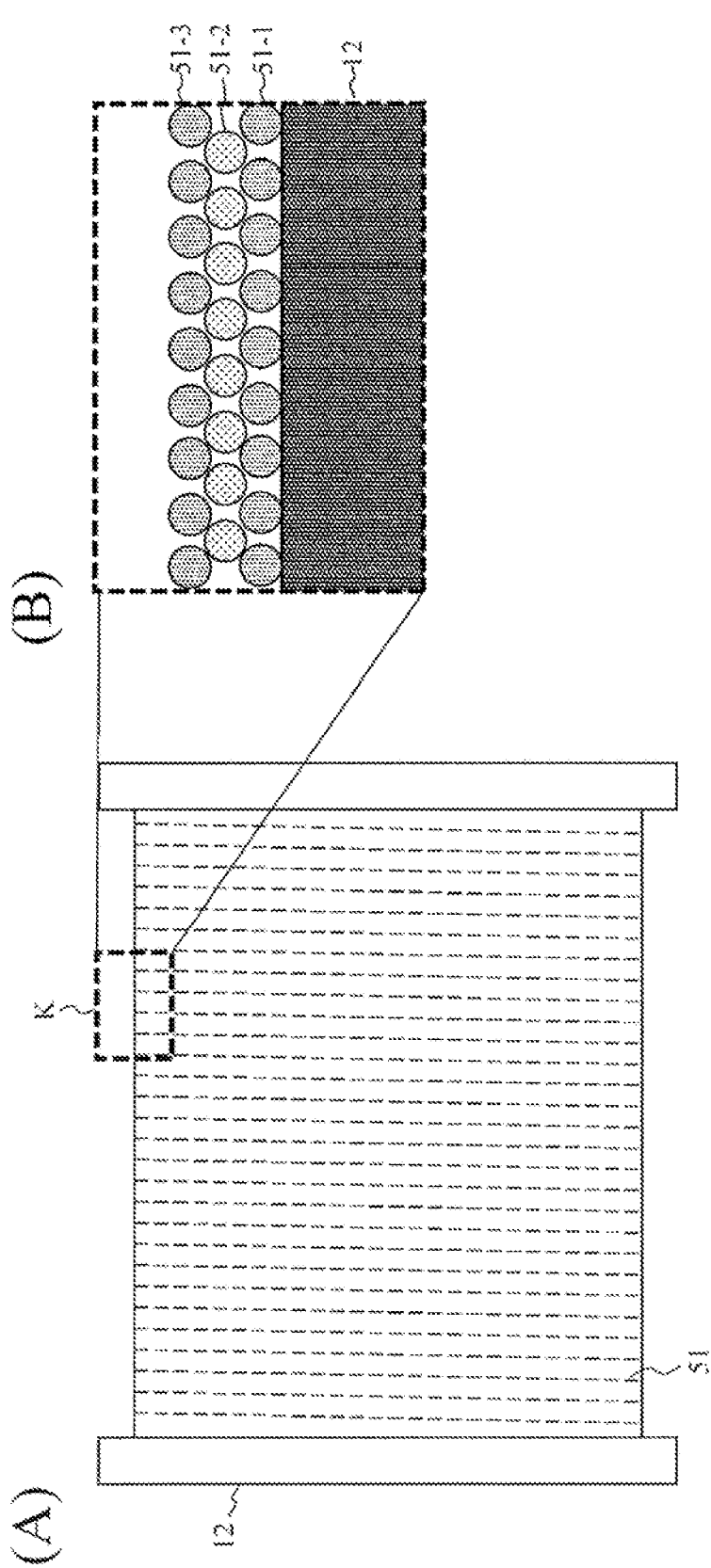
FIG. 5 is a view illustrating the state of an optical fiber wound by the optical fiber winding device according to the present invention.

FIG. 5 is a view illustrating the bobbin 12 with the optical fiber wound therearound. FIG. 5(A) is an overall view of the bobbin 12, and FIG. 5(B) is an enlarged cross-sectional view of portion K. FIG. 5(B) illustrates the same part as (Y) in FIG. 1(c).

First, the optical fiber 51-1 of the first layer is wound around the winding-side bobbin 12. Here, as the tension for winding the optical fiber 51-1, it is sufficient to apply the minimum tension to the extent of appropriately winding the optical fiber 51-1 around the bobbin 12. For example, the tension is set to 10 to 100 gf. When the optical fibers (51-2 and 51-3) of the second layer and the third layer are wound from the outside of the optical fiber 51-1, the tension can be increased from 10 to 100 gf in order to prevent the optical fiber 51-1 from being broken.

Next, the optical fiber 51-2 to be tested is wound around the second layer of the winding-side bobbin 12. It is desirable that the tension for winding the optical fiber 51-2 be as small as possible. This is because the lateral pressure applied to the optical fiber 51-2 is controlled by the tension of the optical fiber 51-3 of the third layer. Therefore, the tension when winding the optical fiber 51-2 is set to the minimum tension to the extent of appropriately winding the optical fiber around the bobbin 12. For example, the tension is set to 10 to 100 gf.

Here, as an option, for confirmation on whether the tension in winding the optical fiber 51-2 is appropriate or not, the invariable characteristics of the optical fiber 51-2 may be confirmed by performing predetermined optical measurement on the optical fiber 51-2 before and after winding of the optical fiber of the second layer.

Subsequently, the optical fiber 51-3 of the third layer is wound around the winding-side bobbin 12 with a desired tension. With this tension, the optical fiber 51-2 is subjected to minute bending by the same lateral pressure as that in the high-density optical cable. Specifically, the tension controller 14 applies a desired tension to the optical fiber 51-3 when the optical fiber 51-3 of the third layer is wound around the bobbin 12, which is stronger than the tension when the optical fibers (51-1 and 51-2) of the first layer and the second layer are wound around the bobbin 12.

The optical fiber winding device further includes an optical measuring instrument (not illustrated) for performing optical measurement on the optical fiber 51-2 of the second layer. The optical measuring instrument is, for example, an optical time domain reflectometer (OTDR). The optical measuring instrument is connected to the optical fiber 51-2 to be tested, and desired optical measurement (for example, propagation loss measurement) is performed.

By setting the optical fibers 51 of each layer in the same kind, the lateral pressure applied to the optical fibers in the optical cable can be reproduced. By such a method, the same lateral pressure as that in the optical cable can be applied to the optical fiber 51-2 for measurement.

In the above embodiment, an example in which the optical fibers (51-1, 51-2, and 51-3) of each layer are three separated optical fibers, and these optical fibers are wound around the bobbin 12 has been described. As another embodiment, the optical fibers (51-1, 51-2, and 51-3) of each layer may be one optical fiber. When measurement is performed by an optical measuring instrument such as an OTDR capable of measuring distribution in the longitudinal direction of the optical fiber, the three-layer optical fibers (51-1, 51-2, and 51-3) may be one continuous optical fiber (that is, only the section of the second layer is measured by the optical measuring instrument). In the case of this embodiment, when the optical fiber 51 is wound around the bobbin 12, it is not necessary to cut the optical fiber and to exchange the feeding-out-side bobbin 11, and the test of an optical fiber can be simplified.

Figure 6:
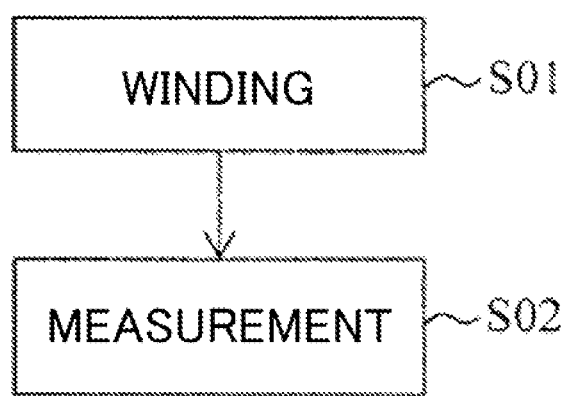
FIG. 6 is a view illustrating an optical fiber testing method according to the present invention.

FIG. 6 is a view illustrating the optical fiber testing method according to the present embodiment. The optical fiber testing method includes:

winding three layers of the optical fibers 51 around the bobbin 12 (step S01);

applying a desired tension to the optical fiber 51-3 when the optical fiber 51-3 of the third layer is wound around the bobbin 12, which is stronger than a tension when the optical fibers (51-1 and 51-2) of the first and second layers are wound around the bobbin 12; and performing optical measurement on the optical fiber 51-2 of the second layer (step S02).

In the optical fiber testing method, the number of the optical fibers 51 may be one, and in the optical measurement, a section corresponding to the second layer of the optical fibers 51 may be measured, or the number of the optical fibers 51 may be three, and each of the optical fibers 51 may be wound on each layer.

APPENDIX

The following is a description of the optical fiber testing method according to the present embodiment.

The present embodiment is an optical fiber testing method for applying lateral pressure to an optical fiber, and the method provides a test apparatus including:

a feeding-out-side bobbin for feeding out an optical fiber;

a winding-side bobbin for winding the optical fiber;

a feeding-out portion that fixes the feeding-out-side bobbin;

a winding portion that fixes the winding-side bobbin;

power that applies rotation to the bobbin to wind the optical fiber in the winding portion;

a control mechanism for controlling the rotation applied to the bobbin by braking or changing the number of rotations in feeding out the optical fiber from the feeding-out portion; and a positioning portion for winding the optical fiber at a desired position in the axial direction of the winding-side bobbin, in which, in winding the optical fiber, previously wound around the feeding-out-side bobbin, around the winding-side bobbin, the optical fiber is wound with a tension, applied to the optical fiber, maintained by the control mechanism.

The optical fiber testing method includes, using the test apparatus: first, previously winding the optical fiber of the first layer around the winding-side bobbin;

second, winding an optical fiber to be tested, which has been previously wound around the feeding-out-side bobbin, around the second layer of the winding-side bobbin;

third, winding the optical fiber of the third layer around the winding-side bobbin in a state in which a tension is applied; and fourth, performing optical measurement on the optical fiber to be tested.

The test apparatus further includes: a tension measuring portion applied to the optical fiber; and a feedback portion that feeds back the measured tension to the control mechanism.

The positioning portion sets a movement amount $\Delta$ in the axial direction of the bobbin to be $D \leq \Delta < 2D$ each time the bobbin rotates once, where D is an outer diameter of the optical fiber.

By using the present invention, it is possible to reproduce lateral pressure and minute bending in a high-density optical cable, and to test characteristics of microbend loss of an optical fiber necessary for making the loss characteristics of the optical cable appropriate.

REFERENCE SIGNS LIST

11: Feeding-out-side bobbin
12: Winding-side bobbin
13: Positioning portion
14: Tension controller
15: Tension measuring portion
20: Wire mesh
30: Sandpaper
51: Optical fiber
51-1: Optical fiber of first layer
51-2: Optical fiber of second layer
51-3: Optical fiber of third layer
150: Measuring instrument
151 to 153: Pulley

The invention claimed is:

1. An optical fiber winding device comprising:
a bobbin for winding an optical fiber that is supplied;
a positioning portion for winding the optical fiber at a desired position in an axial direction of the bobbin;
a tension controller that applies a desired tension to the optical fiber when the optical fiber is wound around the bobbin; and
an optical measuring instrument configured to perform optical measurement on the optical fiber
wherein
the tension controller applies, when the optical fiber of a third layer is wound around the bobbin, a desired tension stronger than a tension applied when the optical fibers of a first and second layers are wound around the bobbin, thereby controlling a side pressure and bending applied to the optical fiber of the second layer by the tension of the optical fiber of the third layer, and
the optical measuring instrument targets the optical fiber of the second layer for the optical measurement.

2. The optical fiber winding device according to claim 1, further comprising a tension measuring portion that measures a tension applied to the optical fiber and feeds back the measured tension to the tension controller so that the measured tension becomes the desired tension.

3. The optical fiber winding device according to claim 1, wherein the positioning portion sets
a movement amount $\Delta$ in an axial direction of the bobbin to be $D \leq \Delta < 2D$ each time the bobbin rotates once, where D is an outer diameter of the optical fiber.

* * * * *